US005329617A

United States Patent [19]

Asal

[11] Patent Number: 5,329,617

[45] Date of Patent: Jul. 12, 1994

[54] GRAPHICS PROCESSOR NONCONFINED ADDRESS CALCULATION SYSTEM

[75] Inventor: Michael D. Asal, Sugar Land, Tex.

[73] Assignee: Texas Instruments Incorporated, Dallas, Tex.

[21] Appl. No.: 150,569

[22] Filed: Nov. 10, 1993

Related U.S. Application Data

[63] Continuation of Ser. No. 735,203, Jul. 24, 1991, abandoned, which is a continuation of Ser. No. 386,057, Jul. 23, 1989, abandoned.

[51] Int. Cl.[5] ........................ G06F 12/10; G09G 1/02

[52] U.S. Cl. .................................... 395/166; 395/165; 395/400; 345/190; 345/200

[58] Field of Search ............... 395/166, 165, 164, 400; 345/200, 190, 203, 28

[56] References Cited

U.S. PATENT DOCUMENTS

| | | | |
|---|---|---|---|
| 4,689,807 | 8/1987 | Maan | 377/57 |
| 4,704,697 | 11/1987 | Kiremidjian et al. | 364/518 |
| 4,718,024 | 1/1988 | Guttag et al. | 364/518 |
| 4,752,893 | 6/1988 | Guttag et al. | 364/518 |
| 4,862,150 | 8/1989 | Katsura et al. | 340/703 |
| 4,884,069 | 11/1989 | Farand | 340/799 |
| 4,905,167 | 2/1990 | Yamaoka et al. | 364/521 |
| 4,912,658 | 3/1990 | Sfarti et al. | 364/521 |
| 4,933,878 | 6/1990 | Guttag et al. | 364/521 |
| 4,945,497 | 7/1990 | Malachowsky et al. | 364/518 |
| 5,047,958 | 9/1991 | Comins et al. | 364/521 |

*Primary Examiner*—Raymond J. Bayerl

*Attorney, Agent, or Firm*—Robert D. Marshall, Jr.; James C. Kesterson; Richard L. Donaldson

[57] ABSTRACT

A graphics processing system allows for fuller utilization of memory space by allowing freedom in performing X-Y conversions to linear addressing for graphics display. The system takes advantage of the fact that many display pitch dimensions can be defined in terms of powers of 2, thereby allowing for simple shifts in the binary value followed by an addition of two such shifted numbers. For non-even situations full multiplication by the pitch is available. This operation is controlled by the values in two registers, which values in turn control the actual shifting and multiplication functions.

8 Claims, 2 Drawing Sheets

| | | |
|---|---|---|
| MODE 1: | VALUE A > 0<br>VALUE B = 0 | SHIFT ONCE – THE MAGNITUDE OF SHIFT CONTROLLED BY VALUE A |
| MODE 2: | VALUE A > 0<br>VALUE B > 0 | SHIFT TWICE – EACH MAGNITUDE OF SHIFT CONTROLLED BY A AND THEN B |
| MODE 3: | VALUE A = 0 | PITCH ARBITRARY (MULTIPLICATION) |

LINEAR BIT ADDRESS = ( Y • PITCH ) + ( X • PIXEL SIZE ) + OFFSET

*FIG. 4*

*FIG. 5*

ASSUME

| ROW (Y) | COLUMN (X) |
|---|---|
| 0001(h) | 0002(h) |

CONVERT TO LINEAR

[ Y • PITCH ] + [ X • PIXEL SIZE ]

[(0001h) • (200h)] + [(0002h) • (0007h)]

[ 200h ] + [ 10h ]

LINEAR = 210h

*FIG. 6*

0002h LSB 0010 SHIFT LEFT THREE = 10000 OR 10h

0008h LSB 1000 $LOG_2 8 = 3$

*FIG. 7*

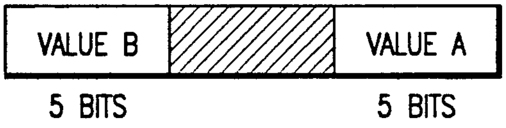

MODE 1: VALUE A > 0, VALUE B = 0 — SHIFT ONCE – THE MAGNITUDE OF SHIFT CONTROLLED BY VALUE A

MODE 2: VALUE A > 0, VALUE B > 0 — SHIFT TWICE – EACH MAGNITUDE OF SHIFT CONTROLLED BY A AND THEN B

MODE 3: VALUE A = 0 — PITCH ARBITRARY (MULTIPLICATION)

GRAPHICS PROCESSOR NONCONFINED ADDRESS CALCULATION SYSTEM

This application is a continuation of U.S. patent application Ser. No. 07/735,203 filed Jul. 24, 1991 and now abandoned, which is a continuation of U.S. patent application Ser. No. 07/386,057 filed Jul. 23, 1989 and now abandoned.

TECHNICAL FIELD OF THE INVENTION

This invention relates to graphic processor memory storage systems and more particularly to an arrangement for storing pixel information in a nonconfined manner and for accessing the information conveniently.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

| Ser. No. | Title |
|---|---|
| 07/387,568 | Video Graphics Display Memory Swizzle Logic and Expansion Circuit and Method (now U.S. Pat. No. 5,233,690) |
| 07/898,398 | Video Graphics Display Memory Swizzle Logic Circuit and Method (now U.S. Pat. No. 5,269,001) |
| 07/387,459 | Graphics Floating Point Coprocessor Having Matrix Capabilities (now U.S. Pat. No. 5,025,407) |
| 08/143,232 | Graphics Processor Trapezoidal Fill Instruction Method and Apparatus |
| 08/156,993 | Graphic Processor Three-Operand Pixel Transfer Method and Apparatus |
| 07/783,727 | Graphics Processor Plane Mask Mode Method and Apparatus (now abandoned) |
| 07/386,936 | Dynamically Adaptable Memory Controller For Various Size Memories (now U.S. Pat. No. 5,237,672) |
| 07/387,472 | Graphics Processor Having a Floating Point Coprocessor (now abandoned) |
| 07/387,553 | Register Write Bit Protection Apparatus and Method (now U.S. Pat. No. 5,161,122) |
| 07/387,569 | Graphics Display Split-Serial Register System (now abandoned) |
| 07/387,455 | Multiprocessing Multiple Priority Bus Request Apparatus and Method (now abandoned) |
| 07/387,325 | Processing System Using Dynamic Selection of Big and Little Endian Coding (now abandoned) |
| 07/386,850 | Real Time and Slow Memory Access Mixed Bus Usage (now abandoned) |
| 07/387,479 | Graphics Coprocessor Having Imaging Capability (now abandoned) |
| 07/387,255 | Graphics Floating Point Coprocessor Having Stand-Alone Graphics Capability (now abandoned) |
| 07/713,543 | Graphics Floating Point Coprocessor Having Vector Mathematics Capability (now abandoned) |
| 07/386,849 | Improvements in or Relating to Read-Only Memory (now U.S. Pat. No. 5,079,742) |
| 07/387,266 | Method and Apparatus for Indicating When a Total in a Counter Reaches a Given Number (now U.S. Pat. No. 5,060,244) |

BACKGROUND OF THE INVENTION

In graphics systems, the graphic display information is contained in a graphics memory at specific locations in the memory. This information is then mapped to the video screen in a one-for-one format. To save time and for convenience, the representations on the screen follow each other sequentially, and the same sequential order is used in memory to store the data for each pixel of information on the screen.

However, problems arise in that video memories have square characteristics with a fixed number of points in the matrix. A video screen, on the other hand, has a number of points called pixels, with each pixel having a number of bits which must be presented to that pixel. Since it is desired to use the same physical memory for many different screen sizes, it is customary to create the memory having a size at least large enough to directly map the largest number of pixels that would be encountered in any one screen. In order to accomplish this goal and not burden the processor with vast numbers of calculations, there must be some easy mathematical coordination between the memory location and the screen location for any data bit. The importance of such ease of calculations can be appreciated when it is realized that in a typical video graphics system each eight bit pixel must be sent to the screen every 12.7 ns. A typical screen would have a pixel array of 1280 by 1024. The display is refreshed 60 times a second. Time spent in processing address information on a per pixel basis then becomes critically important.

There are two basic ways to address a pixel in memory. The first of these is the X-Y coordinate method, which seems to be the natural way to think of memory locations. The second method would be to use a linear or vector address giving location data starting from an arbitrary 00 point. Using this system, the processor must calculate the actual position of each pixel.

Problems arise in the calculations, however, unless special steps are taken to organize the data in the memory exactly as it is presented on the screen. Assume for a moment that the memory is 2,000 columns wide, but the number of necessary screen locations would only take up perhaps 1,500 columns. Visualizing this then, one part of the memory would be vacant. This "extra" memory space is hard to use for any other purpose, and thus effectively, wasted.

In an attempt to achieve full utilization of the memory, two problems must be solved. One is that there must be a method of removing the information from the ends of the lines of memory and wrapping the end around to the next line of memory. One method of shifting information to a screen is contained in co-pending application entitled "Graphics Display Split Serial Register System", Ser. No. 07/387,569, now abandoned, filed concurrently herewith, which application is herein incorporated by reference.

The second problem is the restriction that the pixel size must be a power of 2. This restriction stems from the fact that the processor must be able to easily calculate the address of the first pixel in each next row of pixels. The distance between pixel rows is called the pitch. If memory is to be utilized fully, the addresses must be consecutive with the first address in a screen row being the next binary numerical memory address after the address in the preceding row. Since the number of bits per pixel plus the pitch of the screen must be first multiplied and then added together to translate from an X-Y address to a linear address, it follows that any such calculations, because of their great numbers, must be quickly performed. Thus, it is always desired to reduce such calculations to a simple data shift. This can be accomplished when it is realized that the data is binary and thus multiplication by a power of 2 simply requires a one position bit shift, for each such power.

Based upon the need for quick mathematical operations, a restraint is placed on the number of pixels in a row and this restraint limits the number of pixels to powers of 2.

Accordingly, a need exists in the art for a system which allows for the utilization of pixels of any size without adding to the processing time for data translation.

A need also exists in the art for an arrangement which allows the pixel size to be any number and which allows for the packing and shifting of the bits into consecutive memory space so as to conserve memory capacity.

SUMMARY OF THE INVENTION

There is disclosed an arrangement which allows a video memory to be packed solid by allowing for coordinate conversion from X-Y to linear by a power of 2 several times, as controlled by an external register. The arrangement allows three different modes of operation for the XY linear conversion based upon the pixel pitch.

The first mode is that the pixel number in a row (pitch) is an exact power of 2. In this situation there is a shift for the Y value.

The second mode is when the pitch is the sum of two powers of 2. In a situation of 1280 pixels for instance, (which is 1024+256), the conversion can be performed with just one extra shift value. Thus, first there is a shift by the log of 1024 followed by a shift for the log of 256. This results in one extra shift but is still a very quick method.

In the third mode where it is desired to use an undefined pitch, a straight multiplication is achieved. This allows full flexibility for the system.

Control of the system is accomplished by establishing a register containing the shift values. This register is not precoded, so the linear conversion process itself can use the information in the shift value register to decide which mode it is in.

Generally, the shift value register works to control the shifting, with the first value controlling the first power of 2. If that value is a designated value, such as zero, then the system understands that there is no shifting, and the system will perform a multiply. If the register is not 0, the system performs a first shift and will use the register value to control the power of two-shift; then the second digit in the register is looked at and if it is not 0, the system understands to do the sum of two powers of 2. Multiplication is performed when there are no power of 2 shifts set up by the register.

It is a technical advantage of this invention that by establishing the shift and multiply values in registers, the memory c an be encoded independent of software and independent of the X-Y linear conversion. Thus, a pitch can be set as desired, and the system will use the best method of conversion. The system allows for better utilization of the memory and less constraints on the system configuration.

BRIEF DESCRIPTION OF THE DRAWINGS

For a more complete understanding of the present invention and for further advantages thereof, reference is now made to the following Detailed Description, taken in conjunction with the accompanying Drawings, in which:

FIG. 4 is an equation for calculating the linear address from the X-Y coordinates;

FIGS. 5 and 6 show sample calculations; and

FIG. 7 shows the registers controlling the system.

DETAILED DESCRIPTION OF THE INVENTION

The present invention is set in the environment of a graphic processing system where a graphic memory holds display pixel information for presentation to a display. There are a number of such systems, one being shown in patent application Ser. No. 965,561, effectively filed Apr. 27 1989 and assigned to the assignee of this invention. The aforementioned application is incorporated herein by reference. Also incorporated by reference herein is Texas Instruments Inc. User's Guides TMS 34010 and TMS 34020 along with Designer's Handbook TMS 34082. These documents are available to the general public from Texas Instruments Inc., P.O. Box 1443, Houston, Tex. 77251-1443.

For convenience and ease of understanding the inventive concepts taught herein there has been no attempt to show each and every operation and data movement since the actual embodiment of the invention in a system will, to a large degree, depend upon the actual system operation in which the inventive concept i s embodied. The mathematical calculations which are required to be performed to achieve the results of the inventive concept can be performed by the floating point coprocessor described in concurrently fi led copending patent application entitled Graphics Processor Having A Floating Point Coprocessor, which application is hereby incorporated by reference herein. The aforementioned coprocessor operates in conjunction with a graphics processor of the type referenced herein or can operate as a stand-alone processor.

Before beginning the detailed discussion, a brief review of the problem might be helpful. The problem stems, in part, from a desire to utilize the graphics memory to its fullest extent in the most efficient manner. This problem has several parts, and one important part is disclosed, as discussed above in concurrently filed, copending patent application entitled Graphics Display Split-Serial Register System.

Since it is desired to use the same physical memory for many different screen sizes it is customary to create the memory having a size at least large enough to directly map the largest number of pixels that would be encountered in any one screen. In order to accomplish this goal and not burden the processor with vast numbers of calculations there must be some easy mathematical coordination between the memory location and the screen location for any data bit. The importance of such ease of calculations can be appreciated when it is realized that in a typical video graphics system each eight bit pixel must be sent to the screen every 12.7 ns. A typical screen would have a pixel array of 1280 by 1024. The display is refreshed 60 times a second. Time spent in processing address information on a per pixel basis then becomes critically important.

Figure 1:
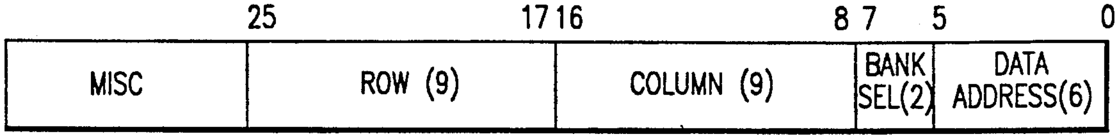
FIG. 1 shows a typical data stream having row and column addresses.

Turning now to FIG. 1, there is shown a typical bus address configuration showing column and row addressing for selection of a data bit, or more accurately, a row of data, from the graphic memory. The column and row bits can be 8, 9, 10 and even more depending upon the memory size. These bits can be expressed in hexadecimal format for ease of notation, keeping in mind that hexadecimal translates easily back to binary. The arrangement of data in FIG. 1 is not critical and can be any arrangement allowing for row and column address information to be processed. It is this information that is to be converted to a linear address for presentation to a video display such as that shown in FIG. 2.

Figure 2:
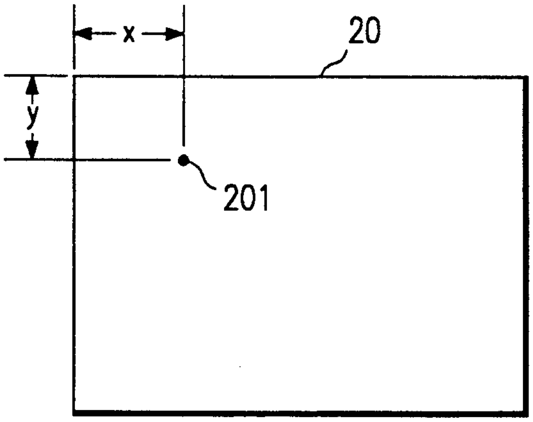
FIG. 2 is a representation of one pixel on a screen.

The FIG. 2 display 20 has pixel point 201 displaced from the upper left corner by a distance X moving from left to right and by the distance Y moving top to bottom. Thus, coordinate position 00 would be in the upper left hand corner for our illustration. The exact physical location of position 00 is determined by a factor called the offset, which is not important to an understanding of this invention, but must be used by the processor to position the display properly. The use of the offset is well-known and will not be detailed herein.

Position 201 is defined as a pixel position and can contain any number of bits. The bits control the color, brightness and other attributes of the display at that point. The number of pixels on a row can vary from screen to screen, but typically can be 1280 with 1024 rows. Because of the variation from screen to screen the calculation for conversion from X-Y addressing to linear addressing must be done on a system basis and tailored to each system.

Figure 3:
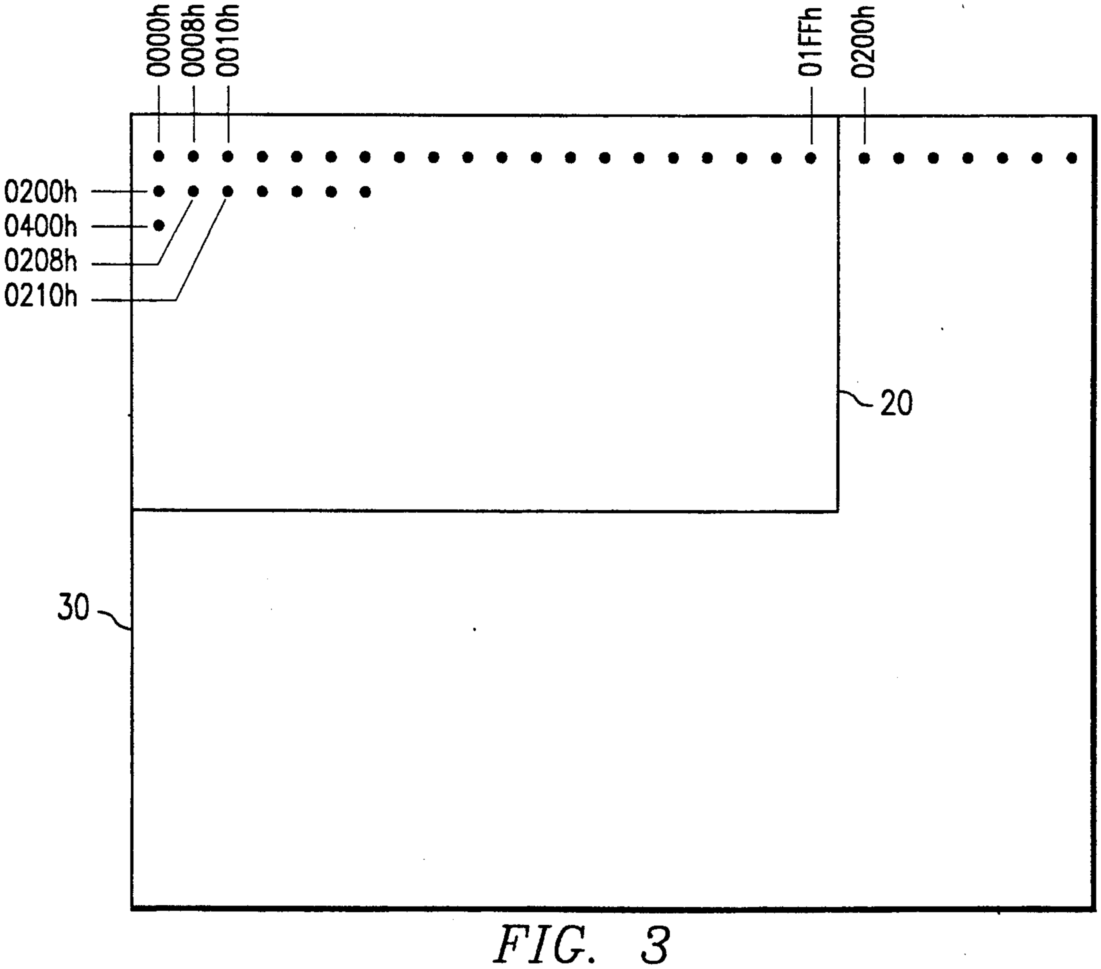
FIG. 3 is a representation of a screen superimposed on a memory.

Shifting now to FIG. 3 there is shown display 20 superimposed on memory 30. Note that in this figure we have shifted to hexadecimal notation for the screen X and Y coordinates in order to keep the drawing and description of the operation free of unnecessary clutter. In FIG. 3 it will be noted that the first row of pixels is shown as single dots, but it should be understood that each of these dots contain a number of bits. Since the address difference between the first two pixels is 0008h it can be assumed that the pixel size is 8 bits. The next pixel linear address is 0010h in hexadecimal format. These pixels continue across the row and if the row of the screen were coextensive with physical graphic memory 30, then the address numbering would continue into the next row. This is shown by the first dot (pixel) outside the superimposed display boundary in memory 30 being labeled 0200h as is the first dot on row 2. The number 0200h is selected for illustrative purposes and in reality would be a much higher value. Again, this unrealistic number is being used for ease of understanding the operation of the invention.

Following this logic, then, if the first pixel on row two of display 20 were to have the next logical linear address after the last linear address 01FFh on the top row of display 20 then that linear address would be 0200h. Thus, the value difference between pixel one of row 1 and pixel one of row 2 is the value 0200h. This value is called the pitch and is dependent upon the number of pixels in each row and the number of bits per pixel.

Since the number of bits per pixel plus the pitch of the screen must be first multiplied and then added together to translate from an X-Y address to a linear address it follows that all such calculations, because of their great numbers must be simple to make. Thus, it is always desired to reduce such calculations to a series of additions. This can be accomplished when it is realized that the data is binary, i.e., in a base 2 number system. In such a system, multiplication by a power of the base simply means shifting the bit positions by the number of such powers. When the base is 10, which we are very familiar with, multiplication by two powers of 10 (100) simply means adding two 0's, or shifting the number to the left two places. As we know, 9 times 100 (two powers of 10) is 900 (shifted left twice). So it is with binary numbers. Multiplication of a binary number by one power of 2 means adding one zero (one shifted position). Multiplication by three powers of 2 means adding three 0's.

With this as background let us look at the equation in FIG. 4 which establishes the linear address from the X-Y address in accordance with the above discussion. The Y coordinate number (in binary form) is multiplied by the pitch. This result is then added to the product of the X coordinate (also in binary form) multiplied by the pixel size. This total is then added to the offset, which, as we discussed, is not part of this discussion and will be ignored from this point on.

Since, as discussed, most systems keep the pixel size a power of two, the X multiplication is a simple shift left 1, 2, 3 or 4 places. In our example, the pixel size is 0008h which translates in binary to (the four LSB least significant bits) 1000. This is 2 to the 3rd power or a left shift of these three places as shown in FIG. 6.

Let's now consider the calculation of the linear address of a point in the third column, second row. The row and column address is shown in FIG. 5. Taking the column (x) bits first and converting the least significant four bits to binary as shown in FIG. 6 yields 0010 Shifting that value left three places yields 10000 binary or 10h hexadecimal.

Now we turn our attention to the pitch calculation. In the best possible of situations the pitch number would also be a power of two. Then all we would have to know was how many places to shift the y coordinate value. For our example, the two results are added to yield 210h, which we can see from FIG. 3 is the 3rd pixel of row 2.

FIG. 7 shows a two part register storing values A and B. The system looks to these registers to determine which type of calculation to make. Mode one controls the easy case where the pitch is an exact power of 2. The value of A would be the required shift value corresponding to the proper power of 2 and thus would direct the processor to perform a left shift the number of positions set forth in value A. This arrangement also allows for situations where the (Y) address bits are presented in the most significant half of the register. By adjusting the value of A, a right shift can be performed to compensate for this bit positioning.

Mode two is the situation where the pitch is calculated to be the sum of two powers of two. This then provides more flexibility to the system and allows a wider range of pitch values, still without causing a significant change in processing time. In this mode, value A controls the number of left shifts of Y for the first operation creating a first result. Value B controls the number of shifts of Y creating a second result. These two results are added together to give the Y portion of the linear address. The X position is, as we discussed, a power of 2 and thus also a simple shift.

In mode one, the calculations typically require two processor cycles. In mode two, three cycles are required. This is not a harsh penalty to pay for the increased pitch flexibility.

Mode three is a different story altogether. In this situation, the pitch is arbitrary and thus simple shifting can not be performed. Full multiplication must be used. Mode three is signified to the processor by a designated value, such as a 0, as value A. Under this condition, a full multiply must be undertaken where the Y coordinate value must be multiplied by the pitch value. This is full 16-bit by 32-bit multiplication and typically would require 15 processor cycles.

Thus, while a high time penalty is paid for flexibility, this may be a better trade-off for some situations than being forced to limit pitch characteristics which otherwise could be beneficial to a user. This system, then, provides the user with a high degree of design choice using the simple loading of two registers to control the process.

While the specific embodiment discussed shows two shift values A and B, it must be understood that many shift values could be used to arrive at a result. The alternative would be to use a hardware multiplier which would utilize valuable space.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A video graphics system, comprising:

a display medium having pixel locations arranged in rows with the address location between adjacent rows defined in terms of pitch used for converting X-Y memory addresses consisting of separate X coordinates and Y coordinates into linear physical locations on said display;

a video presentation memory having established locations therein corresponding to each said pixel location;

a register for controlling said conversion, said register including a first section storing a first value and a second section storing a second value; and circuitry connected to said register for converting pixel display medium address locations from said memory from said X-Y address format used within said memory to said linear addresses based upon said digits in said register, said circuitry if said first value of said first section of said register has a predetermined value, performing a full multiplication of said Y coordinate and said pitch, if said first value of said first section of said register does not have said predetermined value and said second value is zero, shifting said Y coordinate by said first value number of places forming a first resultant, and if said first value of said first section of said register does not have said predetermined value and said second value is not zero, shifting said Y coordinate by said first value number of places forming a first resultant, shifting said Y coordinate by said second value number of places forming a second resultant, and adding said first resultant and said second resultant forming a third resultant.

2. The video graphics system of claim 1, wherein: said predetermined value is zero.

3. A method of calculating the linear address of a graphical display from presented X-Y binary value coordinates, said display having a number of bits within each pixel in the X direction and a pitch dimension, expressed in binary format, between rows in the Y direction, said method comprising the steps of:

accessing a first register to determine a first value contained therein;

based upon a determined first value different from a designated value, indicating that the pitch is an exact power of two or that the pitch is calculated to be the sum of two powers of two, shifting a presented Y coordinate binary value a number of places dependent upon said first value to obtain a first resultant value;

based upon said shifting of said Y coordinate, accessing a second register to determine a second value contained therein;

based upon a determined positive second value, shifting said presented Y coordinate binary value a number of places dependent upon said second value to obtain a second resultant value;

adding together said first and second resultant values; and based upon a determined first value equal to said designated value, indicating that the pitch is neither an exact power of two nor the sum of two powers of two, enabling a full multiplication of said presented Y coordinate binary number by said binary pitch dimension to obtain a third resultant value.

4. The method as set forth in claim 3 further including the steps of:

shifting a presented X coordinate binary value a number of places dependent upon the size of each pixel to obtain a fourth resultant value; and adding together selected combinations of said first, second, third and fourth resultant values to obtain said linear address corresponding to said presented X and Y coordinates.

5. The method of claim 4 wherein one of said selected combinations comprises said first and fourth resultant values.

6. The method of claim 4 wherein one of said selected combinations comprises said third and fourth resultant values.

7. The method of claim 4 wherein one of said selected combinations comprises said second and fourth resultant values.

8. The method of claim 3, wherein: said designated value is zero.

* * * * *